US008511838B2

(12) United States Patent
Rothaar

(10) Patent No.: US 8,511,838 B2
(45) Date of Patent: Aug. 20, 2013

(54) SCANNING LASER PROJECTOR WITH SAFETY SYSTEM

(75) Inventor: Bruce C. Rothaar, Woodinville, WA (US)

(73) Assignee: Microvision, Inc., Redmond, WA (US)

( * ) Notice: Subject to any disclaimer, the term of this patent is extended or adjusted under 35 U.S.C. 154(b) by 183 days.

(21) Appl. No.: 13/172,735

(22) Filed: Jun. 29, 2011

(65) Prior Publication Data

US 2013/0003026 A1 Jan. 3, 2013

(51) Int. Cl.
*G03B 21/28* (2006.01)
(52) U.S. Cl.
USPC .......... 353/99; 353/30; 353/31; 353/69; 353/70; 353/122; 359/199.1; 359/199.2; 349/8; 372/38.09
(58) Field of Classification Search
USPC .......... 353/30, 31, 37, 46, 69, 70, 85, 98, 353/99, 122; 359/196, 199.1, 199.2, 202.1, 359/203.1, 204.1, 234, 242, 247; 348/790, 348/791, 792, 795, 800, 801, 802, 96, 97, 348/98, 99, 110, 112; 349/5, 7–9
See application file for complete search history.

(56) References Cited

U.S. PATENT DOCUMENTS

| 5,163,063 | A  | * | 11/1992 | Yoshikawa et al. | 372/38.02 |
| 7,628,327 | B2 |   | 12/2009 | Winkler et al. | |
| 7,746,527 | B2 | * | 6/2010  | Takeda | 359/202.1 |
| 7,756,174 | B2 |   | 7/2010  | Benner | |
| 7,901,084 | B2 | * | 3/2011  | Willey et al. | 353/49 |
| 7,911,412 | B2 | * | 3/2011  | Benner et al. | 345/55 |
| 2005/0024704 | A1 | | 2/2005 | Sakai | |
| 2007/0285625 | A1 | | 12/2007 | Yavid et al. | |

OTHER PUBLICATIONS

Microvision, Inc., , "ISR and Written Opinion", ISR and Written Opinion PCT/US2012/044425 Jan. 7, 2013.

* cited by examiner

*Primary Examiner* — Georgia Y Epps
*Assistant Examiner* — Sultan Chowdhury
(74) *Attorney, Agent, or Firm* — Kevin D. Wills

(57) ABSTRACT

A scanning projector includes a MEMS device with a scanning mirror that sweeps a light beam in two dimensions. A laser limit comparison circuit determines a metric from measured peak scan angles and measured light output. The metric is compared to a threshold and a light source is shut down when the metric exceeds the threshold.

20 Claims, 12 Drawing Sheets

SCANNING LASER PROJECTOR WITH SAFETY SYSTEM

FIELD

The present invention relates generally to projection systems, and more specifically to scanning projection systems.

BACKGROUND

Laser devices are given safety classifications based on many factors including output power, wavelength, light beam size, and mode of operation. Example laser devices include laser pointers that are continuously operated, pulsed laser light sources that are not continuously operated, and scanning laser projectors with pulsed light beams that are swept in one or more dimensions. Laser safety and classification of laser devices is described in detail in the International Electrotechnical Commission (IEC) 60825-1 standard.

DESCRIPTION OF EMBODIMENTS

Figure 1:
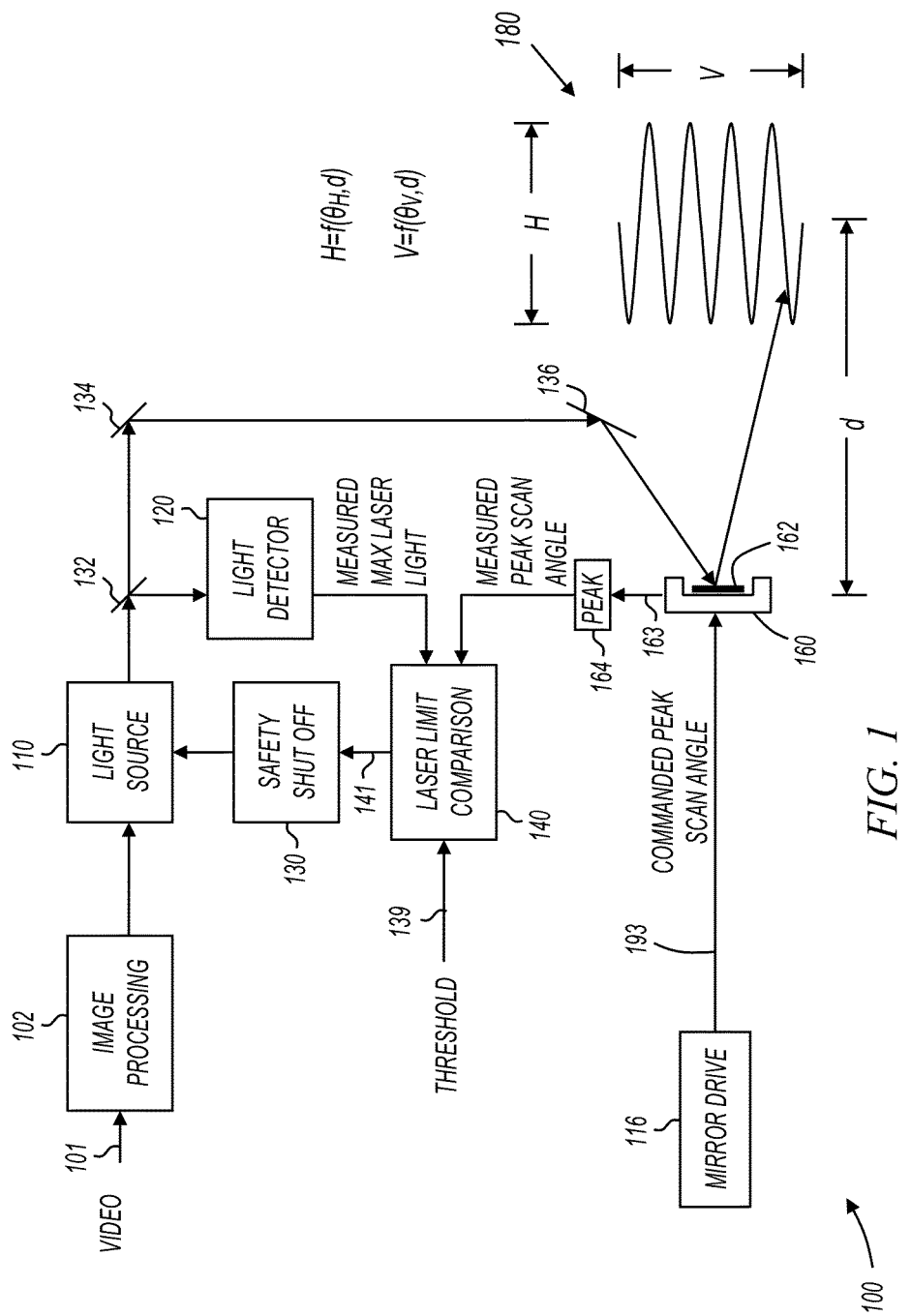
FIG. 1 shows a scanning laser projector in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a scanning laser projector in accordance with various embodiments of the present invention. Scanning laser projector 100 includes image processing component 102, light source 110, micro-electronic machine (MEMS) device 160 having scanning mirror 162, and mirror drive circuits 116. Scanning laser projector 100 also includes light detector 120, laser limit comparison component 140, and safety shut-off component 130.

In operation, image processing component 102 receives video data on node 101 and produces display pixel data to drive light source 110 when pixels are to be displayed. The video data on node 101 represents image source data that is typically received with pixel data on a rectilinear grid, but this is not essential. For example, video data on node 101 may represent a grid of pixels at any resolution (e.g., 640×480, 848×480, 1920×1080). Laser scanning projector 100 is a scanning projector that scans a raster pattern shown at 180. The raster pattern does not necessarily align with the rectilinear grid in the image source data, and image processing component 102 operates to produce display pixel data that will be displayed at appropriate points on the raster pattern. For example, in some embodiments, image processing component 102 interpolates vertically and/or horizontally between pixels in the source image data to determine display pixel values along the scan trajectory of the raster pattern.

Light source 110 receives display pixel data and produces light having grayscale values in response thereto. Light source 110 may be monochrome or may include multiple different color light sources. For example, in some embodiments, light source 110 includes red, green, and blue light sources. In these embodiments, image processing component 102 outputs display pixel data corresponding to each of the red, green, and blue light sources.

In some embodiments, light source 110 may include one or more laser light producing devices. For example, in some embodiments, the light source 110 may include laser diodes. In these embodiments, light source 110 also includes driver circuits that accept the display pixel values and produce current signals to drive the laser diodes. The light from light source 110 is directed to mirror 162 via guiding optics 132, 134, and 136. Any type of optical element may be included in the light path between light source 110 and mirror 162. For example, scanning laser projector 100 may include collimating lenses, dichroic mirrors, or any other suitable optical elements.

Scanning mirror 162 deflects on two axes in response to electrical stimuli received on node 193 from mirror drive circuits 116. While moving on the two axes, scanning mirror 162 reflects light provided by light source 110. The reflected light sweeps a raster pattern and creates a resultant display at 180. The shape of the raster pattern swept by scanning mirror 162 is a function of the mirror movement on its two axes. For example, in some embodiments, scanning mirror 162 sweeps in a first dimension (e.g., vertical dimension) in response to sawtooth wave stimulus, resulting in a substantially linear and unidirectional vertical sweep. Also for example, in some embodiments, scanning mirror 162 sweeps in a second dimension (e.g., horizontal dimension) according to a sinusoidal stimulus, resulting in a substantially sinusoidal horizontal sweep.

MEMS device 160 is an example of a scanning mirror assembly that scans light in two dimensions. In some embodiments the scanning mirror assembly includes a single mirror that scans in two dimensions (e.g., on two axes). Alternatively, in some embodiments, MEMS device 160 may be an assembly that includes two scan mirrors, one which deflects the beam along one axis, and another which deflects the beam along a second axis largely perpendicular to the first axis.

The resultant display has a height (V) and a width (H) that are a function of the distance (d) from scanning mirror 162 to the projection surface, as well as the peak scan angles of the mirror. The width (H) is a function of the distance (d) and the peak horizontal scan angle ($\theta_H$). This relationship is shown in FIG. 1 as $$H = f(\theta_H, d). \tag{1}$$

The height (V) is a function of the distance (d) and the peak vertical scan angle ($\theta_V$). This relationship is shown in FIG. 1 as $$V = f(\theta_V, d). \tag{2}$$

In some embodiments, the electrical stimuli received on node 193 from mirror drive circuits 116 corresponds to commanded peak scan angle(s). For example, in some embodiments, mirror drive circuits 116 command scanning mirror 162 to scan through a peak horizontal scan angle ($\theta_H$) and a peak vertical scan angle ($\theta_V$). As used herein, the term "commanded peak scan angle" refers to the desired peak scan angle as commanded by mirror drive circuits 116.

MEMS device 160 includes the ability to measure one or more actual scan angles of scanning mirror 162. For example, MEMS device 160 may include a first piezoresistive device that produce a voltage proportional to a vertical scan angle, and may include a second piezoresistive device that produces a voltage proportional to a horizontal scan angle. The term "scan angle" as used herein refers to the instantaneous mirror angle as it scans. Peak detector 164 receives the measured scan angle(s) from MEMS device 160 on node 163 and determine the measured peak scan angle. The term "measured peak scan angle" as used herein refers to the peak value of measured scan angles. The measured peak scan angle(s) are provided to laser limit comparison component 140.

Light detector 120 measures light power produced by light source 110. In some embodiments, light detector 120 includes one or more photodetectors. For example, in some embodiments, a single photodetector measures light power at all wavelengths, and in other embodiments, multiple photodetectors are included to measure light power for different colors individually. Light detector 120 provides the measured light output power to laser limit comparison component 140.

Laser limit comparison component 140 determines a metric from the measured light output power and the measured peak scan angles, and compares the metric to a threshold value provided on node 139. In some embodiments, the threshold corresponds to a laser safety limit, such as a class 2 laser as defined in IEC 60825-1, and the value of the metric determines whether the class 2 laser safety limit is exceeded.

When the metric exceeds the threshold, safety circuit 130 is commanded to disable light source 110. Light source 110 may be disabled in any manner without departing from the scope of the present invention. For example, a diode drive circuit may be disabled or a light path may be blocked.

Figure 2:
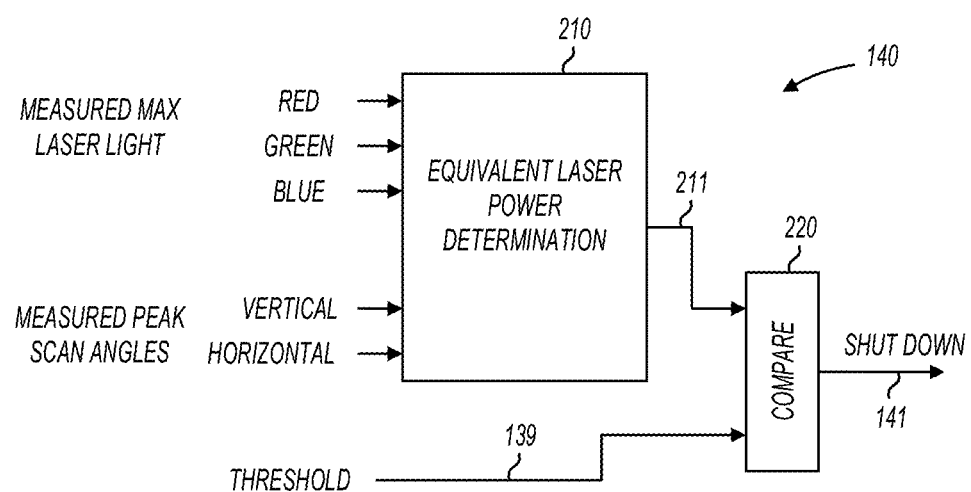
FIG. 2 shows a laser limit comparison component in accordance with various embodiments of the present invention.

FIG. 2 shows a laser limit comparison component in accordance with various embodiments of the present invention. Laser limit comparison component 140 includes equivalent laser power determination component 210 and comparator 220. As shown in FIG. 2, in some embodiments, equivalent laser power determination component 210 receives measured maximum laser light values representing red, green, and blue laser light. In other embodiments, equivalent laser power determination component 210 receives a single measured laser light value. Also in some embodiments, equivalent laser power determination component 210 receives vertical and horizontal measured peak scan angles. In other embodiments, equivalent laser power determination component 210 receives a single measured peak scan angle.

In operation, equivalent laser power determination component 210 determines a metric as a function of measured maximum laser light values and measured peak scan angles. The metric is provided to comparator 220 on node 211. In some embodiments, the metric represents an equivalent laser power in accordance with IEC 60825-1. In other embodiments, the metric corresponds to an equivalent laser power in accordance with a safety classification other than IEC 60825-1.

Comparator 220 compares the metric on node 211 with the threshold on node 139. When the metric exceeds the threshold, a shutdown command is provided on node 141. As shown in FIG. 1, the shutdown command is provided to safety shut off circuit 130 which shuts off light source 110.

Various embodiments of the present invention as shown in FIGS. 1 and 2 are useful to disable the light output from a scanning laser projector in the case of a malfunction. For example, if one or more measured peak scan angles decrease unexpectedly and the metric on node 211 increases beyond the threshold, the light sources will be shutdown so as to keep the scanning laser projector from operating beyond a predetermined safety limit (e.g., class 2). Also for example, if laser light power from one or more laser light sources increases unexpectedly and the metric on node 211 increases beyond the threshold, the light sources will be shutdown so as to keep the scanning laser projector from operating beyond a predetermined safety limit (e.g., class 2).

Laser limit comparison component 140 may be implemented in any fashion without departing from the scope of the present invention. For example, in some embodiments, laser limit comparison component 140 is implemented in hardware, and in other embodiments, laser limit comparison component 140 is implemented in software. In still further embodiments, laser limit comparison component 140 is implemented in a combination of hardware and software.

Figure 3:
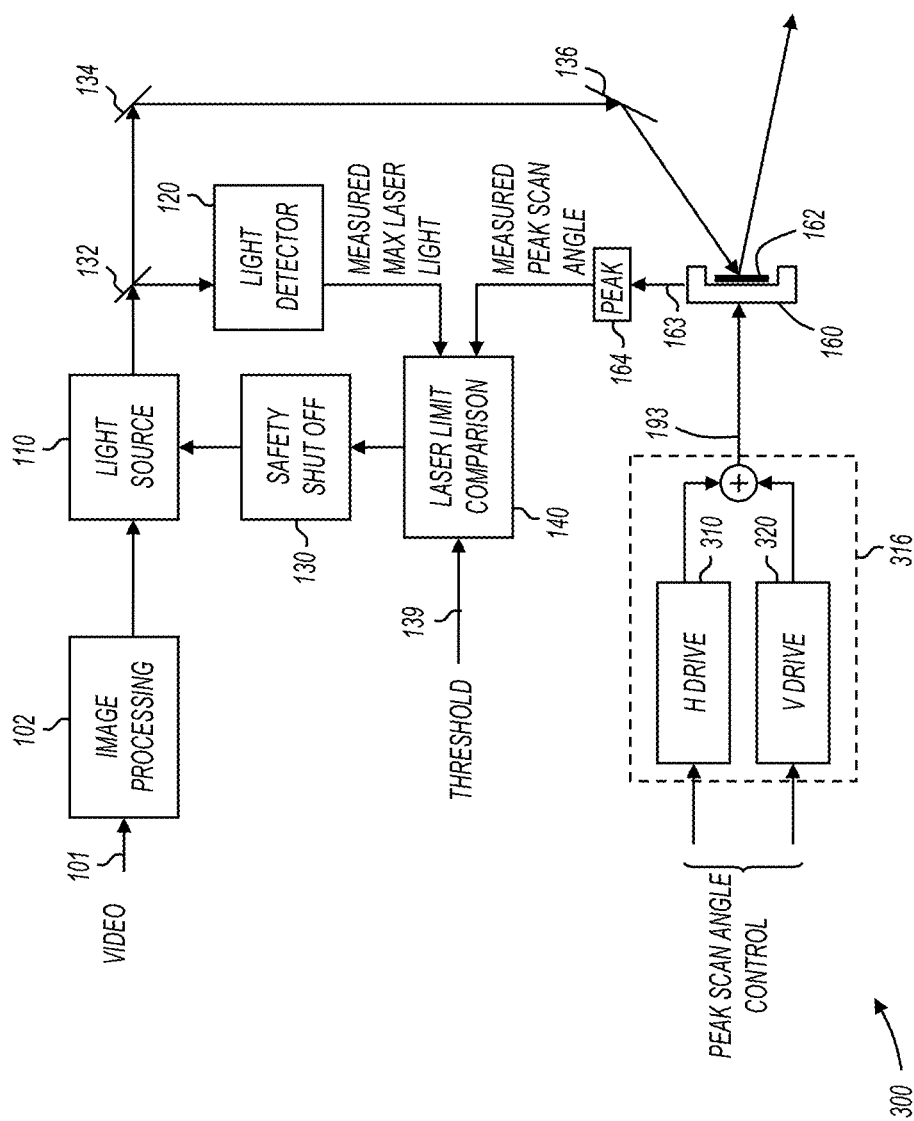
FIGS. 3 and 4 show variable scan angle laser projectors in accordance with various embodiments of the present invention.

FIG. 3 shows a variable scan angle laser projector in accordance with various embodiments of the present invention. Variable scan angle laser projector 300 is similar to laser projector 100 (FIG. 1) except that the mirror drive circuits include a variable peak scan angle ability. In embodiments represented by FIG. 3, mirror drive circuits 316 include horizontal drive component 310 and vertical drive component 320, both of which may be responsive to peak scan angle control values.

In various embodiments of the present invention, either or both of the vertical and horizontal peak scan angles are dynamically modified during operation of variable scan angle laser projector 300 to accomplish various results. Example results include changing the size or aspect ratio of the resultant display, maintaining the size of the resultant display as the distance (d) changes, and maintaining image brightness as the distance and/or aspect ratio changes.

As shown in FIG. 3, horizontal drive component 310 receives peak scan angle control signal stimulus that represents the desired peak horizontal scan angle, and vertical drive component 320 receives peak scan angle control signal stimulus that represents the desired peak vertical scan angle. The peak scan angle control signal stimulus may be provided on multiple signal lines (e.g., dedicated signal lines, or a shared bus) or may be provided on a single signal line (e.g., a serial bus).

Horizontal drive component 310 and vertical drive component 320 receive the peak scan angle signal stimulus and produce signals to effect actual mirror movement through the specified peak scan angles. The signals produced by vertical drive component 320 and horizontal drive component 310 are combined by mirror drive component 316, which drives MEMS device 160 with a composite signal on node 193. In some embodiments that include two scan mirrors, MEMS device 160 is driven directly by signals produced by vertical drive component 320 and horizontal drive component 310.

The peak horizontal and vertical scan angles may be controlled manually, automatically, or any combination. For example, user controls may be provided to allow a user to modify peak scan angles. Also for example, a video source application may specify scan angles or an aspect ratio for the scanning laser projector to use.

Figure 4:
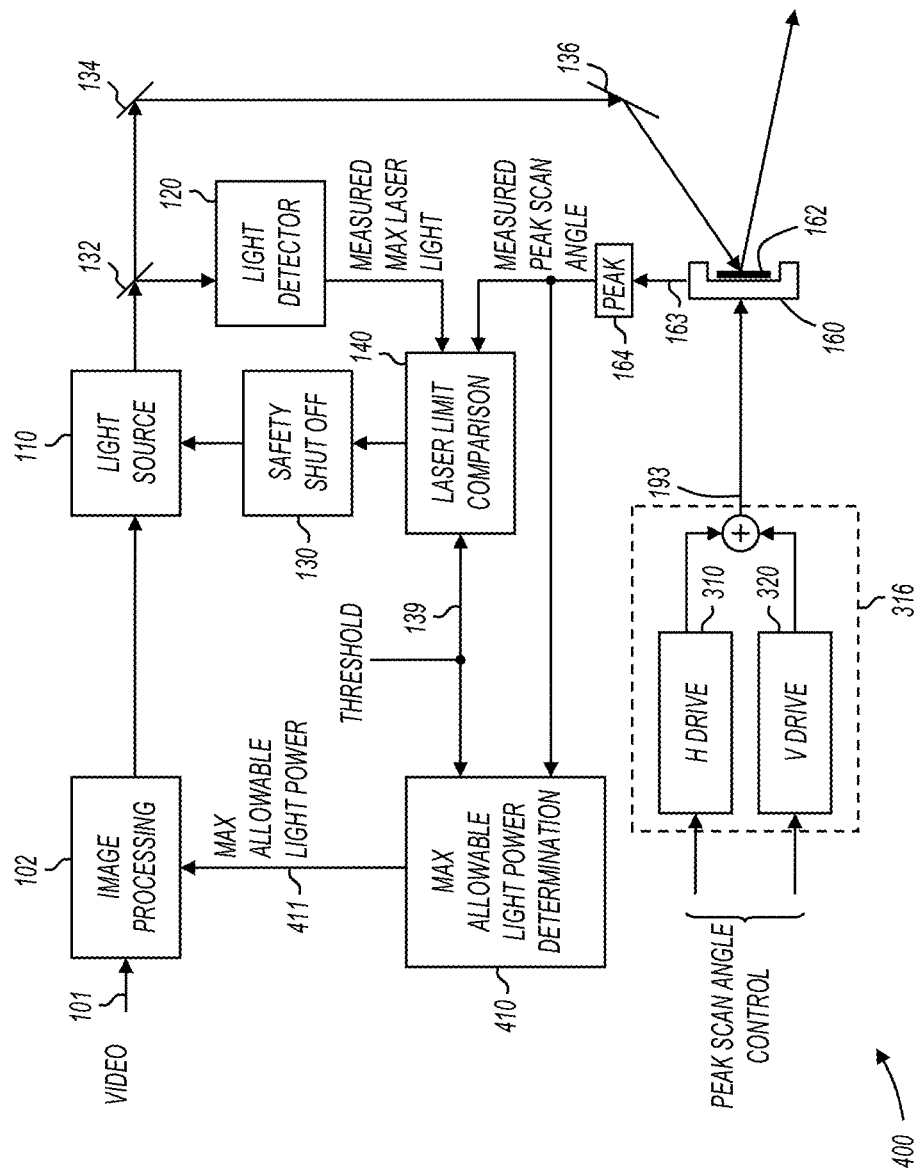

FIG. 4 shows a variable scan angle laser projector in accordance with various embodiments of the present invention. Variable scan angle laser projector 400 is similar to variable scan angle laser projector 300 (FIG. 3), with the addition of maximum allowable light power determination component 410. Maximum allowable light power determination component 410 receives the measured peak scan angle(s) and the threshold, and then determines the maximum allowable laser light power.

In some embodiments, maximum allowable light power determination component 410 determines a maximum allowable laser power for a given pair of measured peak scan angles and a threshold. As described above, the threshold may represent a laser class limit, such as a class 2 laser limit as defined in IEC 60825-1.

In operation, when one or more peak scan angles are modified (automatically, or by a user), variable scan angle laser projector 400 modifies the maximum laser power to maintain the projector within a specific class limit.

Figure 5:
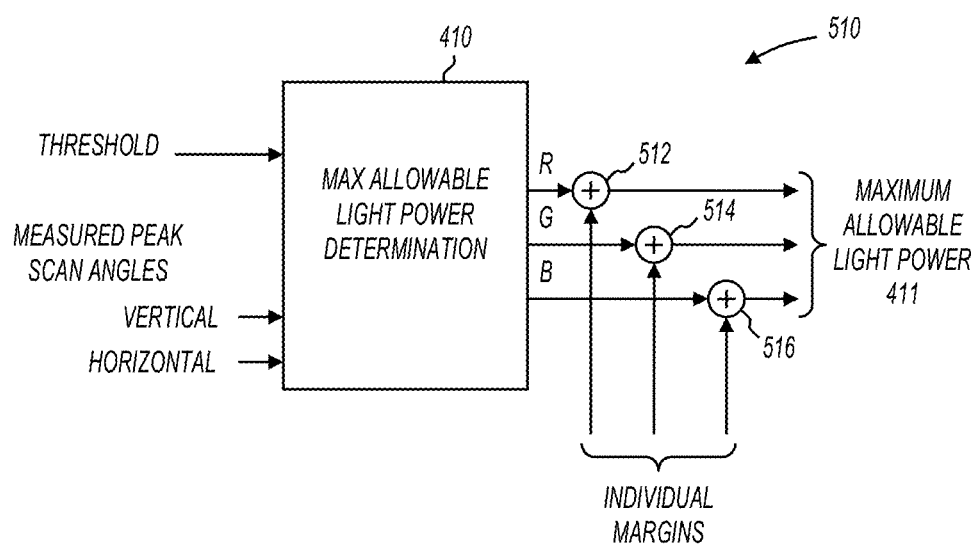
FIG. 5 shows a maximum allowable light power determination component in accordance with various embodiments of the present invention.

FIG. 5 shows a maximum allowable light power determination component in accordance with various embodiments of the present invention. Maximum allowable light power determination component 510 includes maximum allowable light power determination component 410 and optional summing components 512, 514, and 516.

As shown in FIG. 5, maximum allowable light power determination component 410 receives vertical and horizontal measured peak scan angles, and also receives the threshold. Maximum allowable light power determination component 410 uses this information to determine the maximum allowable red, green and blue laser power. In some embodiments, summers 512, 514, and 516 are used to sum in power margins for each individual color to allow for tolerance stacking in the maximum allowable power values provided to image processing component 102.

Figure 6:
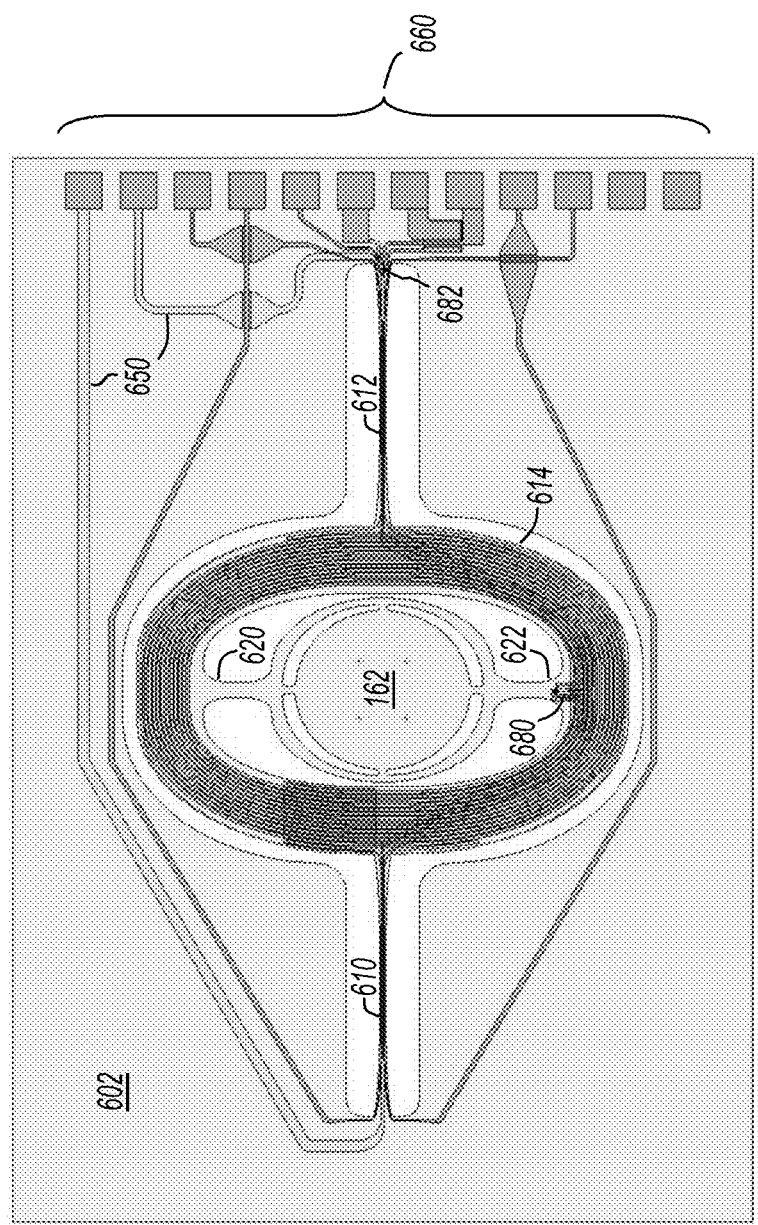
FIG. 6 shows a plan view of a microelectromechanical system (MEMS) device with a scanning mirror.

FIG. 6 shows a plan view of a microelectromechanical system (MEMS) device with a scanning mirror. MEMS device 160 includes fixed platform 602, scanning platform 614 and scanning mirror 162. Scanning platform 614 is coupled to fixed platform 602 by flexures 610 and 612, and scanning mirror 162 is coupled to scanning platform 614 by flexures 220 and 222. Scanning platform 614 has a drive coil connected to drive lines 650, which are driven by a composite signal provided on node 193 from mirror drive circuits 116 (FIG. 1) or 316 (FIGS. 3,4). Current driven into drive lines 650 produces a current in the drive coil. Two of the interconnects 660 are coupled to drive lines 650.

In operation, an external magnetic field source (not shown) imposes a magnetic field on the drive coil. The magnetic field imposed on the drive coil by the external magnetic field source has a component in the plane of the coil, and is oriented non-orthogonally with respect to the two drive axes. The in-plane current in the coil windings interacts with the in-plane magnetic field to produce out-of-plane Lorentz forces on the conductors. Since the drive current forms a loop on scanning platform 614, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The long axis of flexures 610 and 612 form a pivot axis. Flexures 610 and 612 are flexible members that undergo a torsional flexure, thereby allowing scanning platform 614 to rotate on the pivot axis and have an angular displacement relative to fixed platform 602. This angular displacement is referred to herein as the scan angle. Flexures 610 and 612 are not limited to torsional embodiments as shown in FIG. 6. For example, in some embodiments, flexures 610 and 612 take on other shapes such as arcs, "S" shapes, or other serpentine shapes. The term "flexure" as used herein refers to any flexible member coupling a scanning platform to another platform (scanning or fixed), and capable of movement that allows the scanning platform to have an angular displacement with respect to the other platform.

Mirror 162 pivots on a first axis formed by flexures 620 and 622, and pivots on a second axis formed by flexures 610 and 612. The first axis is referred to herein the horizontal axis, and the second axis is referred to herein as the vertical axis. The distinction between vertical and horizontal is somewhat arbitrary, since a rotation of the projection apparatus will cause a rotation of the two axes. Accordingly, the various embodiments of the present invention are not to be limited by the terms "horizontal" and "vertical."

In some embodiments, scanning mirror 162 scans at a mechanically resonant frequency on the horizontal axis resulting in a sinusoidal horizontal sweep. Further, in some embodiments, scanning mirror 162 scans vertically at a non-resonant frequency, so the vertical scan frequency can be controlled independently. MEMS device 160 also incorporates one or more integrated piezoresistive position sensors. Piezoresistive sensors 280 produce a voltage that represents the displacement of mirror 162 with respect to scanning platform 614, and piezoresistive sensors 282 produce a voltage that represents the displacement of scanning platform 614 with respect to fixed platform 602. As shown in FIG. 6, in some embodiments, positions sensors are provided on both scan axes, although this is not a limitation of the present invention. For example, in some embodiments, MEMS device 160 includes a position sensor for only one axis. A subset of interconnects 660 provide connectivity for the integrated position sensors for each axis.

As described further below, in various embodiments of the present invention, one or more peak scan angles of mirror 162 are modified during operation. For example, the peak horizontal scan angle may be modified, the peak vertical scan angle may be modified, or both may be modified. The peak scan angles may be controlled and modified by signal stimulus received on drive lines 250. This signal stimulus is provided on node 193 by drive circuits 116 (FIG. 1) or 316 (FIGS. 3, 4).

The particular MEMS device embodiment shown in FIG. 6 is provided as an example, and the various embodiments of the invention are not limited to this specific implementation. For example, any scanning mirror capable of sweeping in two dimensions to reflect a light beam in a raster pattern may be incorporated without departing from the scope of the present invention. Also for example, any combination of scanning mirrors (e.g., two mirrors: one for each axis) may be utilized to reflect a light beam in a raster pattern. Further, any type of mirror drive mechanism may be utilized without departing from the scope of the present invention. For example, although MEMS device 160 uses a drive coil on a moving platform with a static magnetic field, other embodiments may include a magnet on a moving platform with drive coil on a fixed platform. Further, the mirror drive mechanism may include an electrostatic drive mechanism.

Figure 7:
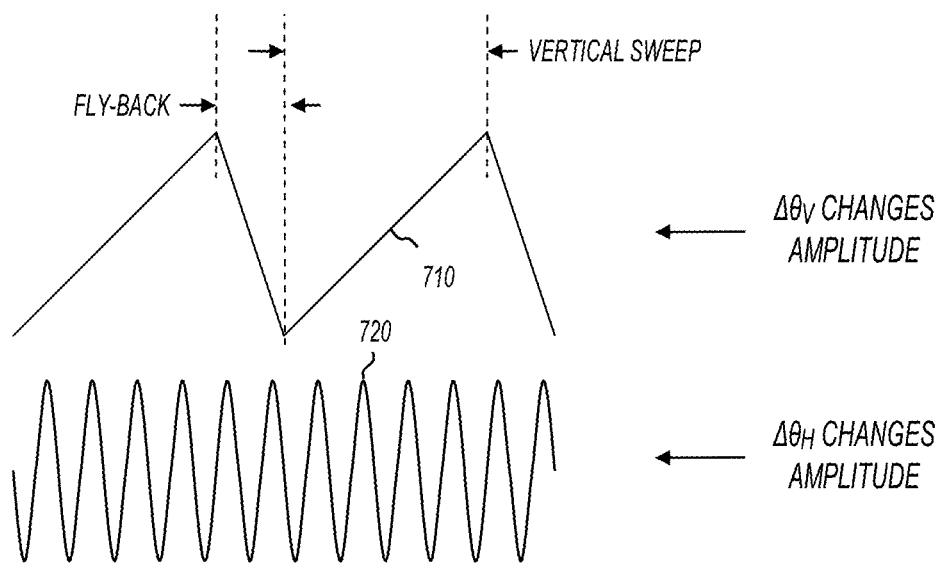
FIG. 7 shows deflection waveforms resulting from a linear vertical trajectory and a sinusoidal horizontal trajectory.

FIG. 7 shows deflection waveforms resulting from a linear vertical trajectory and a sinusoidal horizontal trajectory. Vertical deflection waveform 710 is a sawtooth waveform, and horizontal deflection waveform 720 is a sinusoidal waveform. When mirror 162 is deflected on its vertical and horizontal axes according to the waveforms 710 and 720, the scanned beam trajectory 180 shown in FIG. 1 results.

Deflection of mirror 162 according to waveforms 710 and 720 may be achieved by driving MEMS device 160 with the appropriate drive signals. In some embodiments, the horizontal deflection frequency is at a resonant frequency of the mirror and a very small excitation at that frequency will result in the desired peak scan angle. A sawtooth drive signal for the vertical deflection may be derived from a sum of sine waves at various frequencies. The drive signal for the vertical deflection may also be derived from specific points programmed into a waveform generator.

Although a sawtooth drive signal will result in the vertical deflection shown in FIG. 7, other drive signal embodiments exist. For example, in some embodiments, the vertical drive signal may be a triangle wave (where subsequent frames are written top to bottom followed by bottom to top alternating each frame) or sinusoidal waveforms.

Sawtooth vertical deflection waveform 710 includes vertical sweep portions and flyback portions. In some embodiments, pixels are displayed during the vertical sweep portions, and not during the flyback portions. The flyback portions correspond to the beam "flying back" to the top of the image field of view.

For clarity of explanation, FIG. 7 shows only a few horizontal cycles per vertical sweep. In practice, many more horizontal cycles are present. For example, a horizontal resonant frequency of 24.5 kHz and a frame rate of 60 Hz will yield about 408 horizontal cycles per vertical sweep.

The amplitude of horizontal deflection waveform 720 corresponds to the peak horizontal scan angle. As the amplitude increases, the peak scan angle also increases. Referring now back to FIGS. 1 and 3, as $\theta_H$ increases, horizontal drive component 310 provides stimulus to MEMS 160 that causes the amplitude of horizontal deflection waveform 720 to increase. Stated generally, a change in $\theta_H$ ($\Delta\theta_H$) results in a change in the amplitude of the horizontal deflection waveform 720. Similarly, the amplitude of vertical deflection waveform 710 corresponds to the peak vertical scan angle. As the amplitude increases, the scan angle also increases. Referring now back to FIGS. 1 and 3, as $\theta_V$ increases, vertical drive component 320 provides stimulus to MEMS 160 that causes the amplitude of vertical deflection waveform 710 to increase. Stated generally, a change in $\theta_V$ ($\Delta\theta_V$) results in a change in the amplitude of the vertical deflection waveform 710.

Figure 8:
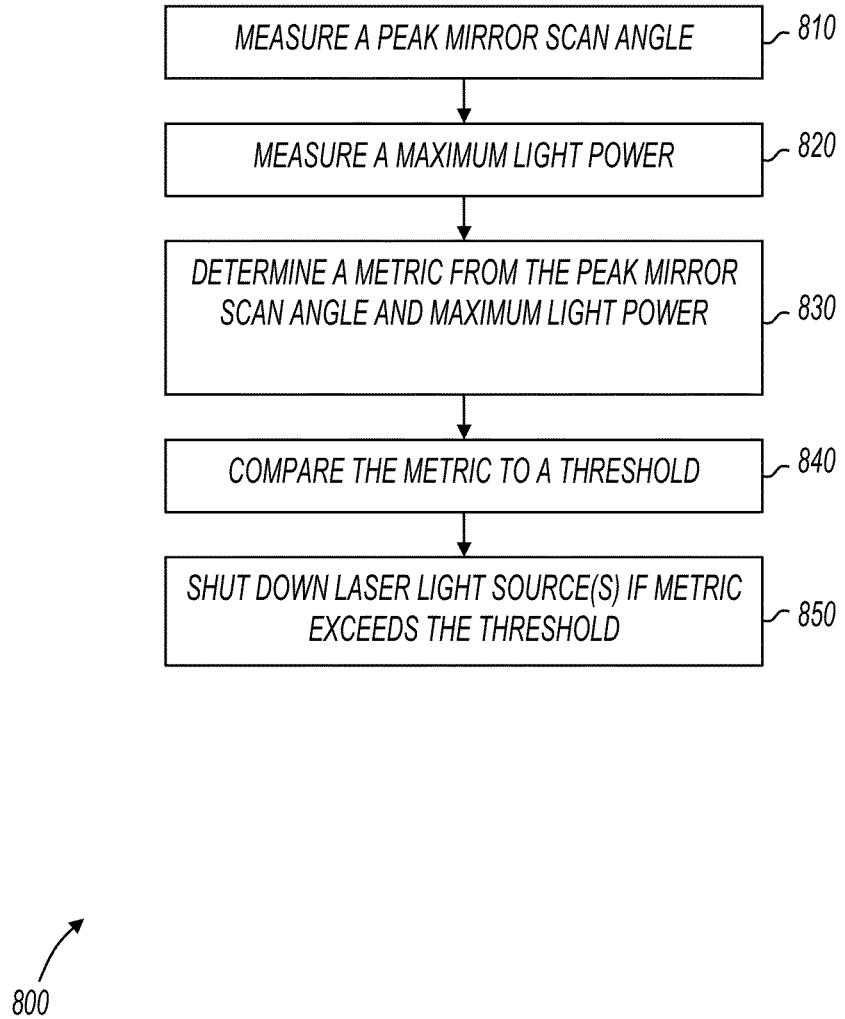
FIGS. 8 and 9 show flow diagrams of methods in accordance with various embodiments of the present invention.

FIG. 8 shows a flow diagram of methods in accordance with various embodiments of the present invention. In some embodiments, method 800, or portions thereof, is performed by a scanning laser projector, embodiments of which are shown in previous figures. In other embodiments, method 800 is performed by a series of circuits or an electronic system. Method 800 is not limited by the particular type of apparatus performing the method. The various actions in method 800 may be performed in the order presented, or may be performed in a different order. Further, in some embodiments, some actions listed in FIG. 8 are omitted from method 800.

Method 800 is shown beginning with block 810. As shown at 810, a peak mirror scan angle is measured. In some embodiments, two mirror scan angles are measured (horizontal and vertical), and then the peak scan angles are determined. The scan angles may be measured by any means without departing from the scope of the present invention. Piezoresistive position sensors are described as examples above with reference to FIG. 6. At 820, a maximum light power is measured. In some embodiments, this corresponds to one or more photodetectors measuring laser light power.

At 830, a metric is determined from the peak mirror scan angle and the maximum light power. In some embodiments, the metric corresponds to an equivalent laser power of a continuous laser that is not angularly swept. At 840, the metric is compared to a threshold. In some embodiments, the threshold corresponds to a laser class limit such as those described in IEC 60825-1. For example, the metric may correspond to a class 2 laser limit.

At 850, if the metric exceeds the threshold, the laser light source(s) are shut down. This corresponds to laser limit comparison component 140 commanding safety shutoff component 130 to shut down light sources 110.

Figure 9:
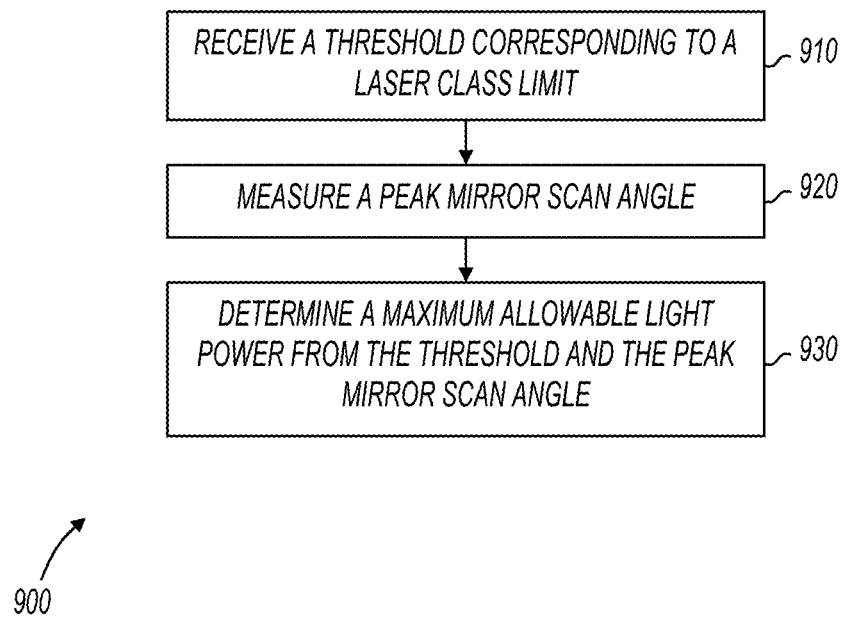

FIG. 9 shows a flow diagram of methods in accordance with various embodiments of the present invention. In some embodiments, method 900, or portions thereof, is performed by a scanning laser projector, embodiments of which are shown in previous figures. In other embodiments, method 900 is performed by a series of circuits or an electronic system. Method 900 is not limited by the particular type of apparatus performing the method. The various actions in method 900 may be performed in the order presented, or may be performed in a different order. Further, in some embodiments, some actions listed in FIG. 9 are omitted from method 900.

Method 900 is shown beginning with block 910. As shown at 910, a threshold corresponding to a laser class limit is received. This corresponds to maximum allowable light power determination component 410 receiving the threshold information on node 139 (FIG. 4). At 920, a peak mirror scan angle is measured. This corresponds to one or more peak scan angles being measured by MEMS device 160, and providing the measured peak scan angles to maximum allowable light power determination component 410.

At 930, a maximum allowable light power is determined from the threshold and the peak mirror scan angle. This information is used by an image processing component such as image processing component 102 (FIG. 1) when scaling laser drive signals to create pixels in a scanning laser projector.

Figure 10:
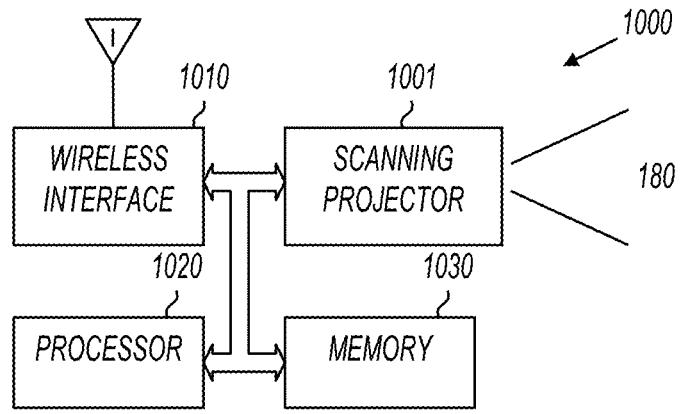
FIG. 10 shows a block diagram of a mobile device in accordance with various embodiments of the present invention.

FIG. 10 shows a block diagram of a mobile device in accordance with various embodiments of the present invention. As shown in FIG. 10, mobile device 1000 includes wireless interface 1010, processor 1020, memory 1030, and scanning projector 1001. Scanning projector 1001 paints a raster image at 180. Scanning projector 1001 is a scanning laser projector as described above with reference to previous figures. Scanning projector 1001 may include safety shutoff circuits and/or dynamic peak scan angle circuits as described herein. Scanning projector 1001 may receive image data from any image source.

For example, in some embodiments, scanning projector 1001 includes memory that holds still images. In other embodiments, scanning projector 1001 includes memory that includes video images. In still further embodiments, scanning projector 1001 displays imagery received from external sources such as connectors, wireless interface 1010, a wired interface, or the like.

Wireless interface 1010 may include any wireless transmission and/or reception capabilities. For example, in some embodiments, wireless interface 1010 includes a network interface card (NIC) capable of communicating over a wireless network. Also for example, in some embodiments, wireless interface 1010 may include cellular telephone capabilities. In still further embodiments, wireless interface 1010 may include a global positioning system (GPS) receiver. One skilled in the art will understand that wireless interface 1010 may include any type of wireless communications capability without departing from the scope of the present invention.

Processor 1020 may be any type of processor capable of communicating with the various components in mobile device 1000. For example, processor 1020 may be an embedded processor available from application specific integrated circuit (ASIC) vendors, or may be a commercially available microprocessor. In some embodiments, processor 1020 provides image or video data to scanning projector 1001. The image or video data may be retrieved from wireless interface 1010 or may be derived from data retrieved from wireless interface 1010. For example, through processor 1020, scanning projector 1001 may display images or video received directly from wireless interface 1010. Also for example, processor 1020 may provide overlays to add to images and/or video received from wireless interface 1010, or may alter stored imagery based on data received from wireless interface 1010 (e.g., modifying a map display in GPS embodiments in which wireless interface 1010 provides location coordinates).

Figure 11:
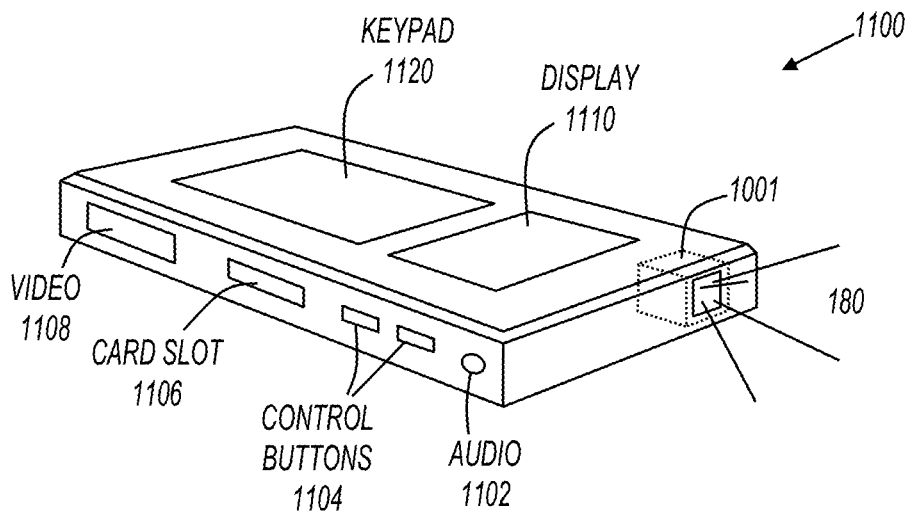
FIG. 11 shows a mobile device in accordance with various embodiments of the present invention.

FIG. 11 shows a mobile device in accordance with various embodiments of the present invention. Mobile device 1100 may be a hand held projection device with or without communications ability. For example, in some embodiments, mobile device 1100 may be a handheld projector with little or no other capabilities. Also for example, in some embodiments, mobile device 1100 may be a device usable for communications, including for example, a cellular phone, a smart phone, a personal digital assistant (PDA), a global positioning system (GPS) receiver, or the like. Further, mobile device 1100 may be connected to a larger network via a wireless (e.g., WiMax) or cellular connection, or this device can accept data messages or video content via an unregulated spectrum (e.g., WiFi) connection.

Mobile device 1100 includes scanning projector 1001 to create an image with light at 180. Mobile device 1100 also includes many other types of circuitry; however, they are intentionally omitted from FIG. 11 for clarity.

Mobile device 1100 includes display 1110, keypad 1120, audio port 1102, control buttons 1104, card slot 1106, and audio/video (A/V) port 1108. None of these elements are essential. For example, mobile device 1100 may only include scanning projector 1001 without any of display 1110, keypad 1120, audio port 1102, control buttons 1104, card slot 1106, or A/V port 1108. Some embodiments include a subset of these elements. For example, an accessory projector product may include scanning projector 1001, control buttons 1104 and A/V port 1108.

Display 1110 may be any type of display. For example, in some embodiments, display 1110 includes a liquid crystal display (LCD) screen. Display 1110 may always display the same content projected at 180 or different content. For example, an accessory projector product may always display the same content, whereas a mobile phone embodiment may project one type of content at 180 while displaying different content on display 1110. Keypad 1120 may be a phone keypad or any other type of keypad.

A/V port 1108 accepts and/or transmits video and/or audio signals. For example, A/V port 1108 may be a digital port that accepts a cable suitable to carry digital audio and video data. Further, A/V port 1108 may include RCA jacks to accept composite inputs. Still further, A/V port 1108 may include a VGA connector to accept analog video signals. In some embodiments, mobile device 1100 may be tethered to an external signal source through A/V port 1108, and mobile device 1100 may project content accepted through A/V port 1108. In other embodiments, mobile device 1100 may be an originator of content, and A/V port 1108 is used to transmit content to a different device.

Audio port 1102 provides audio signals. For example, in some embodiments, mobile device 1100 is a media player that can store and play audio and video. In these embodiments, the video may be projected at 180 and the audio may be output at audio port 1102. In other embodiments, mobile device 1100 may be an accessory projector that receives audio and video at A/V port 1108. In these embodiments, mobile device 1100 may project the video content at 180, and output the audio content at audio port 1102.

Mobile device 1100 also includes card slot 1106. In some embodiments, a memory card inserted in card slot 1106 may provide a source for audio to be output at audio port 1102 and/or video data to be projected at 180. Card slot 1106 may receive any type of solid state memory device, including for example, Multimedia Memory Cards (MMCs), Memory Stick DUOS, secure digital (SD) memory cards, and Smart Media cards. The foregoing list is meant to be exemplary, and not exhaustive.

Control buttons 1104 may be used for any purpose. For example, in some embodiments, control buttons 1104 may be used to navigate a menu system on display 1110. Also for example, in some embodiments, control buttons 1104 may be used to modify one or more peak scan angles. In operation, a user may modify an aspect ratio or size of the projected display by pressing control buttons 1104.

Figure 12:
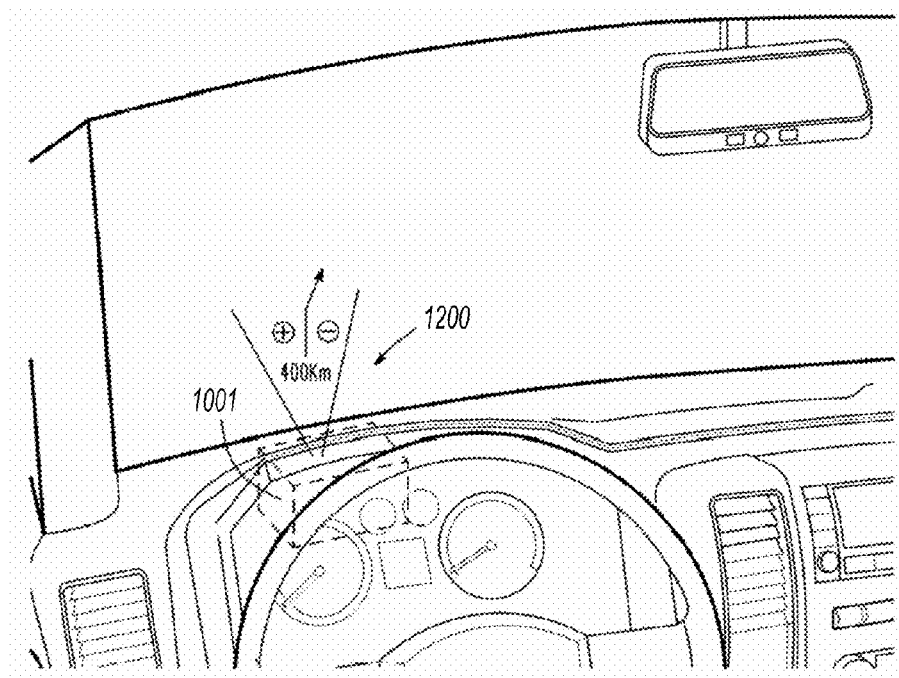
FIG. 12 shows a head-up display system in accordance with various embodiments of the invention.

FIG. 12 shows a head-up display system in accordance with various embodiments of the invention. Projector 1001 is shown mounted in a vehicle dash to project the head-up display at 1200. Although an automotive head-up display is shown in FIG. 12, this is not a limitation of the present invention. For example, various embodiments of the invention include head-up displays in avionics application, air traffic control applications, and other applications. In some embodiments, user controls on projector 1001 are exposed to a driver so that the peak scan angles may be changed manually. Further, in some embodiments, automatic controls perform peak scan angle adjustments to compensate for the distance to the windshield and/or ambient brightness. In still further embodiments, peak scan angles may be specified by a video source (the automotive panel) based on display contents.

Figure 13:
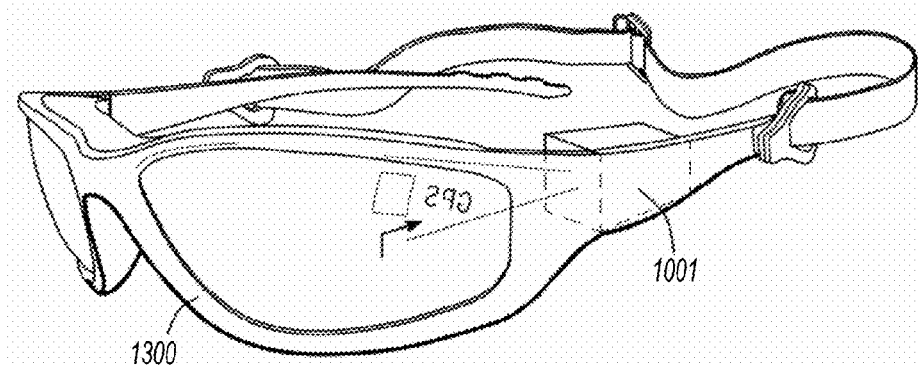
FIG. 13 shows eyewear in accordance with various embodiments of the invention.

FIG. 13 shows eyewear in accordance with various embodiments of the invention. Eyewear 1300 includes projector 1001 to project a display in the eyewear's field of view. In some embodiments, eyewear 1300 is see-through and in other embodiments, eyewear 1300 is opaque. For example, eyewear 1300 may be used in an augmented reality application in which a wearer can see the display from projector 1001 overlaid on the physical world. Also for example, eyewear 1300 may be used in a virtual reality application, in which a wearer's entire view is generated by projector 1001. Although only one projector 1001 is shown in FIG. 13, this is not a limitation of the present invention. For example, in some embodiments, eyewear 1300 includes two projectors; one for each eye.

Figure 14:
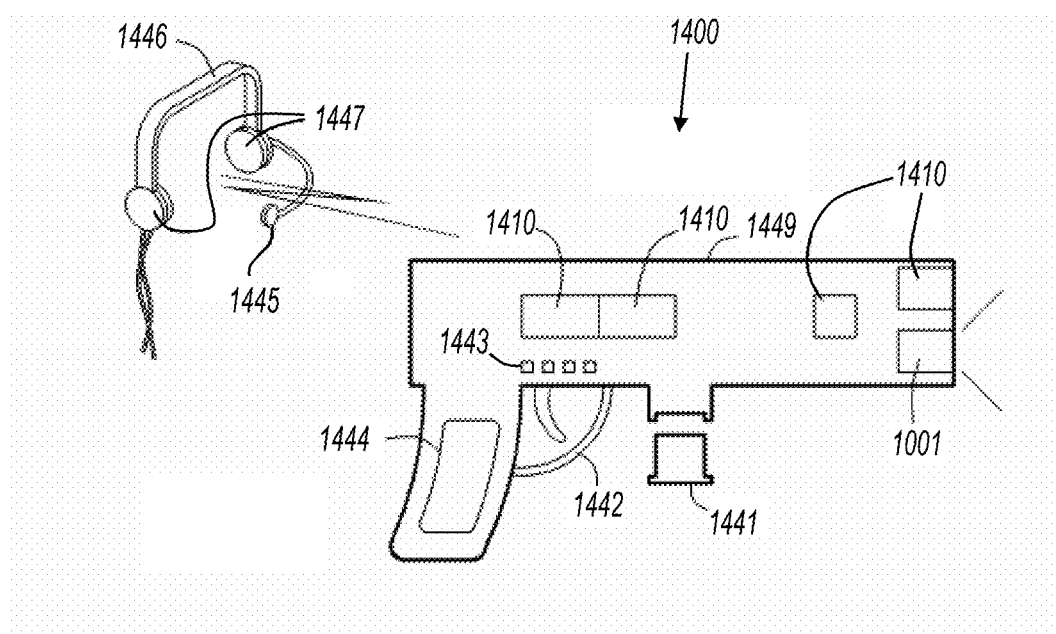
FIG. 14 shows a gaming apparatus in accordance with various embodiments of the present invention.

FIG. 14 shows a gaming apparatus in accordance with various embodiments of the present invention. Gaming apparatus 1400 allows a user or users to observe and interact with a gaming environment. The game is navigated based on the motion, position or orientation of gaming apparatus 1400, an apparatus that includes scanning laser projector 1001. Other control interfaces, such as manually-operated buttons, foot pedals, or verbal commands, may also contribute to navigation around, or interaction with the gaming environment, including peak scan angle changes. For example, in some embodiments, trigger 1442 contributes to the illusion that the user or users are in a first person perspective video game environment, commonly known as a "first person shooter game." Because the size, aspect ratio, and brightness of the projected display can be controlled by the gaming application in combination with the user's movement, gaming apparatus 1400 creates a highly believable or "immersive" environment for these users.

Many other first person perspective simulations can also be created by gaming apparatus 1400, for such activities as 3D seismic geo-prospecting, spacewalk planning, jungle canopy exploration, automobile safety instruction, medical education, etc. Tactile interface 1444 may provide a variety of output signals, such as recoil, vibration, shake, rumble, etc. Tactile interface 1444 may also include a touch-sensitive input feature, such as a touch sensitive display screen or a display screen that requires a stylus. Additional tactile interfaces, for example, input and/or output features for a motion sensitive probe are also included in various embodiments of the present invention.

Gaming apparatus 1400 may also include audio output devices, such as integrated audio speakers, remote speakers, or headphones. These sorts of audio output devices may be connected to gaming apparatus 1400 with wires or through a wireless technology. For example, wireless headphones 1446 provide the user with sound effects via a Bluetooth connection, although any sort of similar wireless technology could be substituted freely. In some embodiments, wireless headphones 1446 may include microphone 1445 or binaural microphone 1447, to allow multiple users, instructors, or observers to communicate. Binaural microphone 1447 typically includes microphones on each ear piece, to capture sounds modified by the user's head shadow. This feature may be used for binaural hearing and sound localization by other simulation participants.

Gaming apparatus 1400 may include any number of sensors 1410 that measure distance, ambient brightness, motion, position, orientation, and the like. For example, gaming apparatus 1400 may detect absolute heading with a digital compass, and detect relative motion with an x-y-z gyroscope or accelerometer. In some embodiments, gaming apparatus 1400 also includes a second accelerometer or gyroscope to detect the relative orientation of the device, or its rapid acceleration or deceleration. In other embodiments, gaming apparatus 1400 may include a Global Positioning Satellite (GPS) sensor, to detect absolute position as the user travels in terrestrial space.

Gaming apparatus 1400 may include battery 1441 and/or diagnostic lights 1443. For example, battery 1441 may be a rechargeable battery, and diagnostic lights 1443 could indicate the current charge of the battery. In another example, battery 1441 may be a removable battery clip, and gaming apparatus 1400 may have an additional battery, electrical capacitor or super-capacitor to allow for continued operation of the apparatus while the discharged battery is replaced with a charged battery. In other embodiments, diagnostic lights 1443 can inform the user or a service technician about the status of the electronic components included within or connected to this device. For example, diagnostic lights 1443 may indicate the strength of a received wireless signal, or the presence or absence of a memory card. Diagnostic lights 1443 could also be replaced by any small screen, such as an organic light emitting diode or liquid crystal display screen. Such lights or screens could be on the exterior surface of gaming apparatus 1400, or below the surface, if the shell for this apparatus is translucent or transparent.

Other components of gaming apparatus 1400 may be removable, detachable or separable from this device. For example, the dynamic scan angle projection apparatus may be detachable or separable from gaming housing 1449. In some embodiments, the subcomponents of the dynamic scan angle projection apparatus may be detachable or separable from gaming housing 1449, and still function.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanning laser projector comprising:
a laser light source to create a light beam;
at least one light detector to measure light output from the laser light source;
a scanning mirror assembly with a scanning mirror to scan the light beam on at least one axis, the scanning mirror assembly including at least one position sensor to measure a mirror scan angle;
a component to determine a metric from both a measured peak mirror scan angle and measured light output and to compare the metric to a threshold; and
a safety circuit to shut off the laser light source if the metric exceeds the threshold.

2. The scanning laser projector of claim 1 wherein the threshold corresponds to a laser class limit.

3. The scanning laser projector of claim 1 further comprising a mirror drive circuit to drive the scanning mirror assembly and effect mirror scanning through a peak mirror scan angle, where the peak mirror scan angle is variable.

4. The scanning laser projector of claim 3 further comprising a circuit to determine a maximum allowable light output as a function of the threshold and the measured peak mirror scan angle.

5. The scanning laser projector of claim 1 wherein the scanning mirror scans the light beam on two axes.

6. The scanning laser projector of claim 5 wherein the component to determine a metric is operable to determine the metric from measured peak mirror scan angles on the two axes.

7. The scanning laser projector of claim 1 wherein the laser light source comprises sources of red, green, and blue light.

8. A scanning laser projector comprising:
a scanning mirror to scan a light beam;
a mirror drive circuit operable to cause the mirror to rotate through a peak mirror scan angle, where the peak mirror scan angle is variable based on an input to the mirror drive circuit; and
a circuit to determine a maximum allowable light beam power based on a measured peak mirror scan angle.

9. The scanning laser projector of claim 8 further comprising a laser diode to create the light beam.

10. The scanning laser projector of claim 9 further comprising a component to determine a metric based on the measured peak mirror scan angle and measured light output from the laser diode.

11. The scanning laser projector of claim 10 further comprising a safety circuit to shut off the laser diode when the metric exceeds a threshold.

12. The scanning laser projector of claim 9 wherein the scanning mirror scans the light in two dimensions, the mirror drive circuit is operable to cause the mirror to rotate through two peak mirror scan angles in the two dimensions, and the circuit to determine the maximum allowable light beam power determines the maximum allowable light beam power based on measured peak mirror scan angles in the two dimensions.

13. The scanning laser projector of claim 12 further comprising a component to determine a metric based on the measured peak mirror scan angles and measured light output from the laser diode.

14. The scanning laser projector of claim 13 further comprising a safety circuit to shut off the laser diode when the metric exceeds a threshold.

15. A mobile device comprising:
an image source;
a laser light source;
an image processing component to drive the laser light source based on pixel data received from the image source;
a scanning mirror to reflect the laser light, the scanning mirror having sensors to measure a peak mirror scan angle for each of two dimensions;
a mirror drive circuit to drive the scanning mirror and effect scanning in the two dimensions; and
a component to determine a maximum allowable light output based on an allowable laser class and measured peak mirror scan angles for each of the two dimensions.

16. The mobile device of claim 15 further comprising a light sensor to measure light output from the laser light source.

17. The mobile device of claim 16 further comprising a processing unit to determine an equivalent laser class based on the measured peak mirror scan angles and measured light output.

18. The mobile device of claim 17 further comprising a safety circuit to disable the laser light source when the equivalent laser class exceeds a threshold.

19. The mobile device of claim 15 wherein the mirror drive circuit is operable to effect variable peak mirror scan angles in the two dimensions.

20. The mobile device of claim 15 wherein the image source comprises a wireless interface.

* * * * *